United States Patent
Okajima

[19]
[11] Patent Number: 6,094,091
[45] Date of Patent: *Jul. 25, 2000

[54] INTERFACE CIRCUIT CAPABLE OF PREVENTING REFLECTED WAVES AND GLITCHES

[75] Inventor: Yoshinori Okajima, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/746,648

[22] Filed: Nov. 13, 1996

[30] Foreign Application Priority Data

May 2, 1996 [JP] Japan ............................. 8-111514

[51] Int. Cl.⁷ .............................. G05F 1/10; G05F 3/02
[52] U.S. Cl. ........................................ 327/540; 326/86
[58] Field of Search ........................ 327/108, 18–20, 327/540, 541, 543, 545, 546, 309, 310, 312, 321, 327, 328; 326/30, 33, 83, 86; 365/230.08

[56] References Cited

U.S. PATENT DOCUMENTS

| | | | |
|---|---|---|---|
| 4,617,529 | 10/1986 | Suzuki | 331/57 |
| 5,179,586 | 1/1993 | Lee | 326/86 |
| 5,347,170 | 9/1994 | Hayakawa et al. | 327/541 |
| 5,438,281 | 8/1995 | Takahashi et al. | 326/86 |
| 5,438,283 | 8/1995 | Lev | 326/86 |
| 5,504,452 | 4/1996 | Takenaka | 327/541 |
| 5,568,060 | 10/1996 | Bartholomay et al. | 326/86 |
| 5,684,411 | 11/1997 | Nepple | 326/86 |

*Primary Examiner*—My-Trang Nuton
*Attorney, Agent, or Firm*—Arent Fox Kintner Plotkin & Kahn PLLC

[57] ABSTRACT

An interface circuit is constructed such that, when a switching in a potential level on a bus connected to semiconductor devices and transmitting data and control information is detected, the bus is controlled to be connected to one of predetermined potentials for a predetermined period of time, in correspondence with a direction in which the switching has occurred.

20 Claims, 16 Drawing Sheets

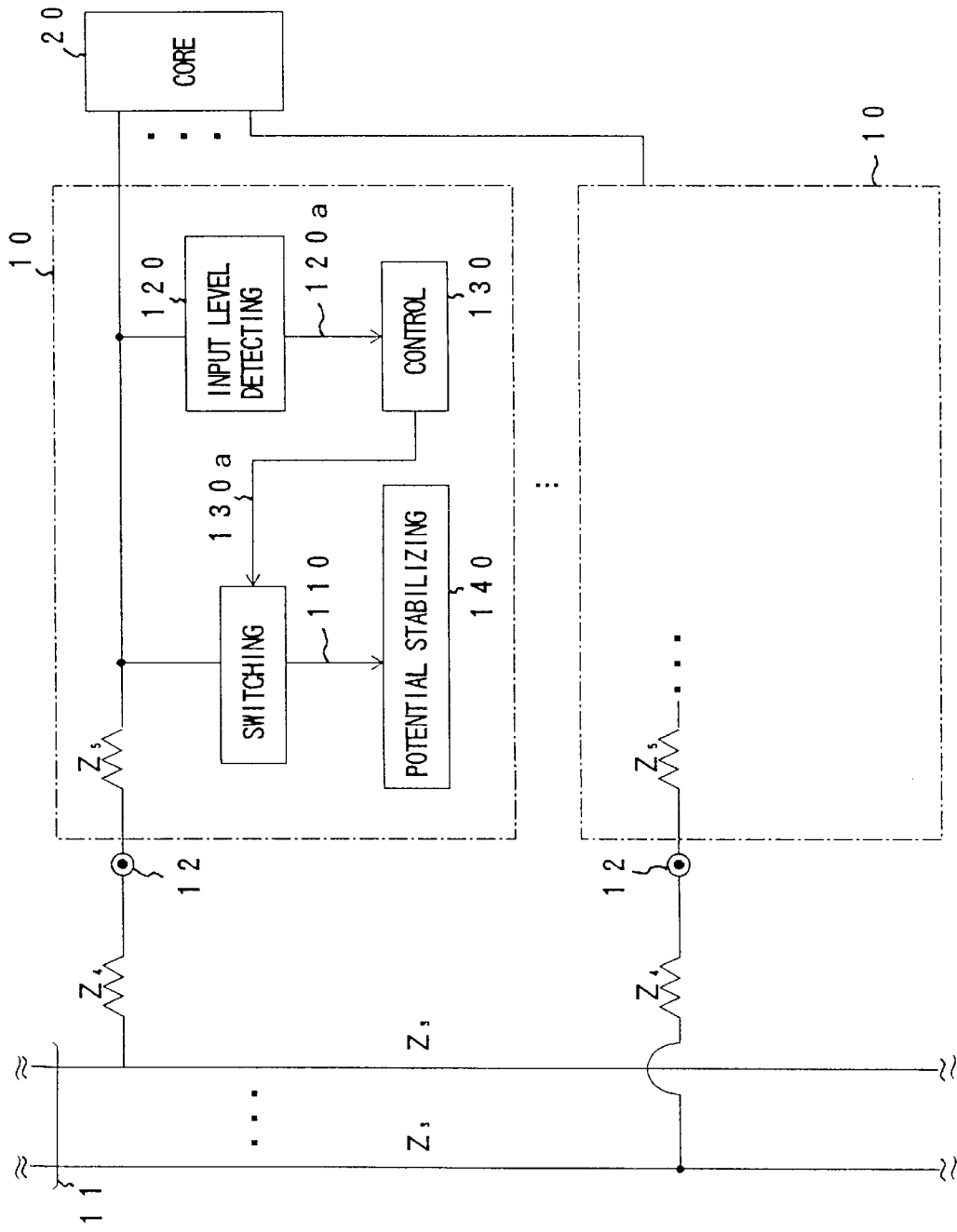

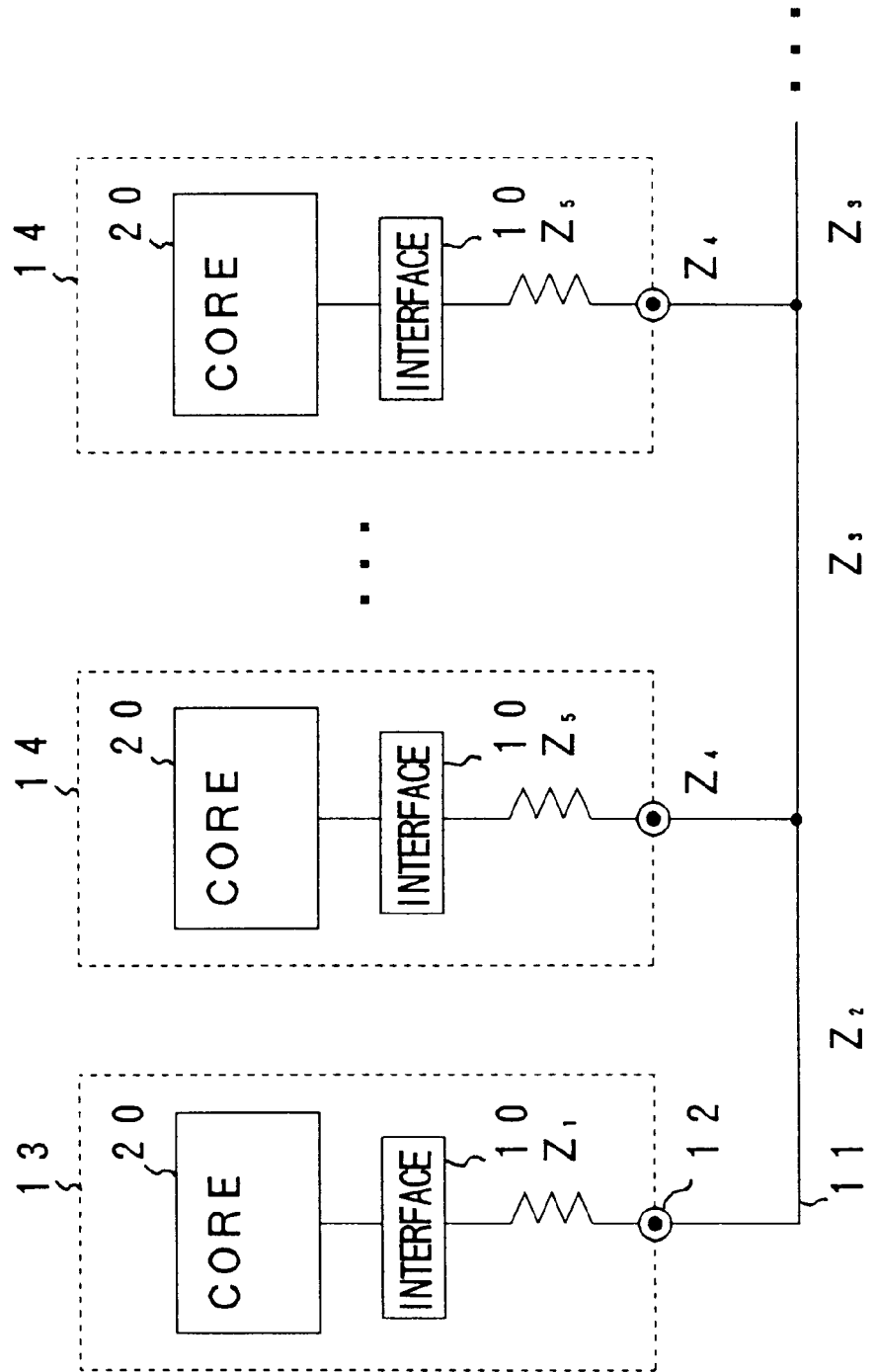

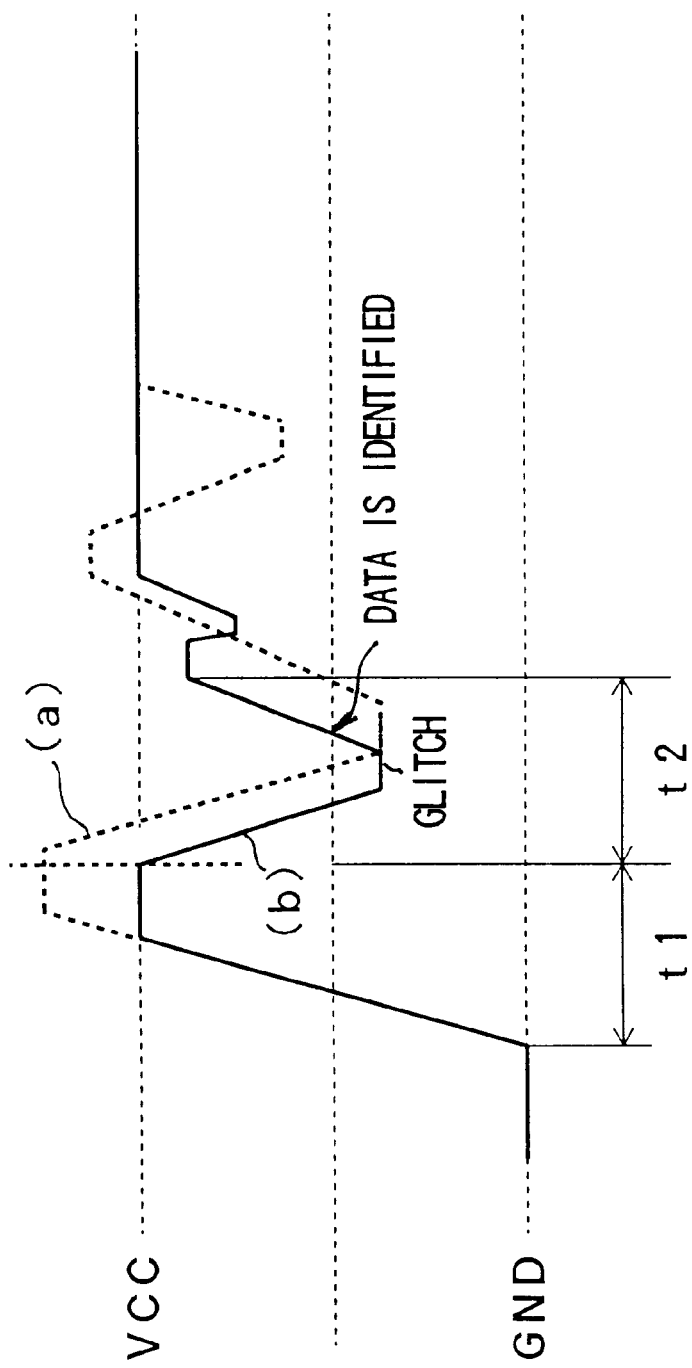

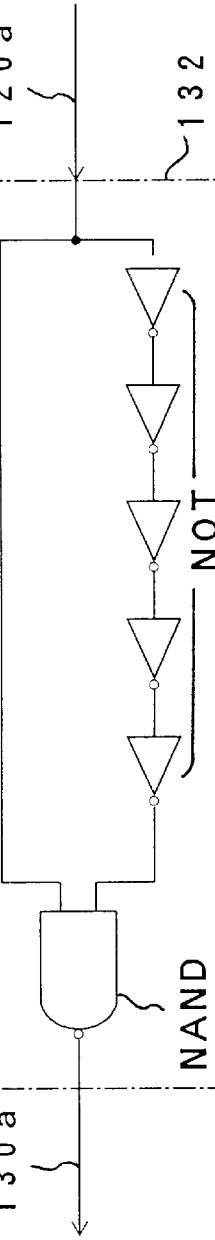
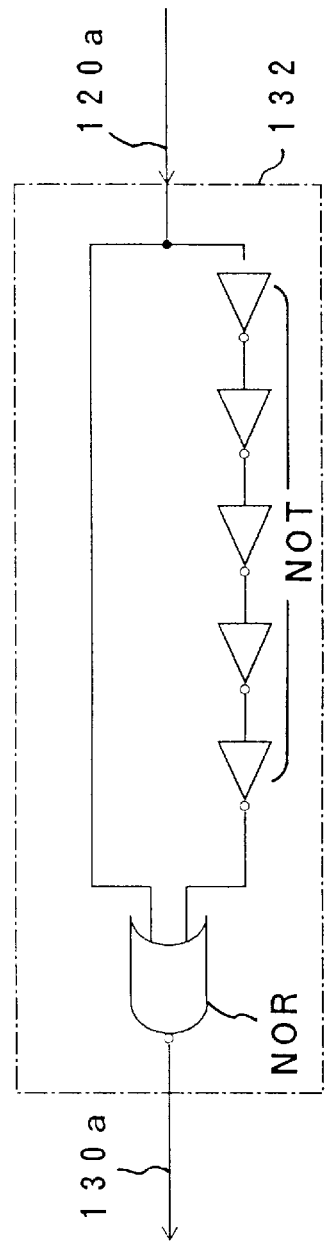
FIG. 7A
FIG. 7B

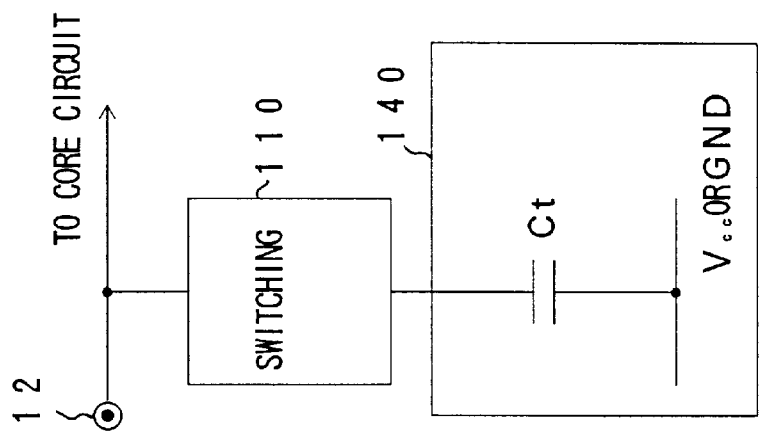
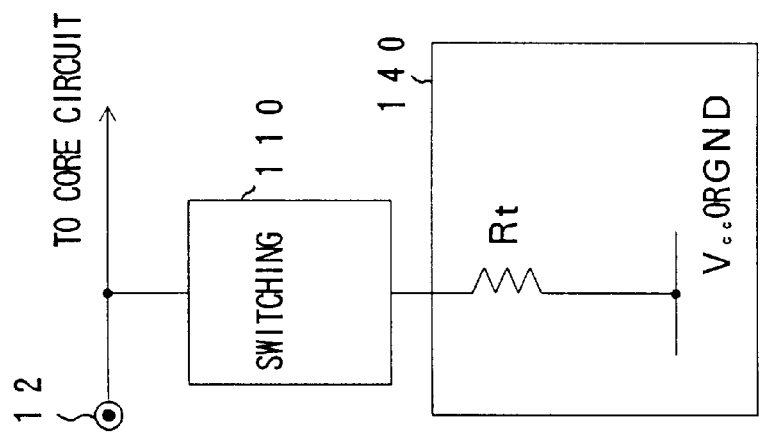
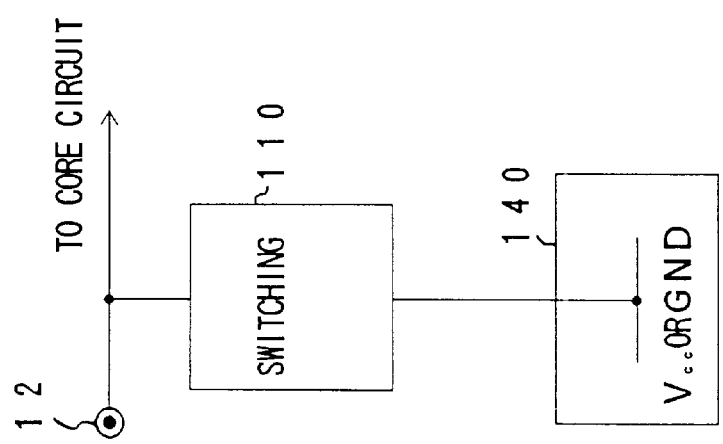

INTERFACE CIRCUIT CAPABLE OF PREVENTING REFLECTED WAVES AND GLITCHES

BACKGROUND OF THE INVENTION

1. Field of the Invention

The present invention generally relates to interface circuits for a semiconductor device, and more particularly, to an interface circuit for a semiconductor device in which reflected waves on a bus are efficiently suppressed even when there is an impedance mismatching between the semiconductor device and a bus, and in which an overshoot and a glitch, a form of waveform distortion, occurring in data or control information transmitted on a bus are efficiently suppressed, the overshoot being responsible for preventing a high-speed operation and the glitch causing an error.

2. Description of the Related Art

FIG. 1 is a block diagram of a conventional technology used to connect semiconductor devices 13 and 14 with a bus 11 via input terminals 12.

As shown in FIGS. 1 and 2, a core circuit 20 for exchanging data via an input/output circuit with external devices and executing a predetermined process (for example, numerical operation or storage of data) on the data, and a plurality of bonding pads that enable the core circuit 20 to exchange signals with external devices are provided on an IC chip of the semiconductor device such as an MPU or a memory. In the IC chip of the MPU, the input terminals 12 are bonded to the respective bonding pads with a bonding wire having an impedance Z1. In the IC chip of the memory, the input terminals 12 are bonded to the respective bonding pads with a bonding wire having an impedance Z5. Each of the IC chips is hermetically sealed in a package so as to constitute a module. Each module is referred to as a MPU chip or a memory chip.

The MPU chip is connected to the bus 11 having an impedance Z2 via a module wiring having an impedance Z2 formed on a printed circuit board or the like so as to form an electric circuit. The memory chip is connected to the bus 11 having an impedance Z3 via a module wiring having an impedance Z4 formed on a printed circuit board or the like. The bus 11 may include a data bus line for transmitting data and a control bus line for transmitting control information such as address information or control instructions. The bus 11 formed on the printed circuit board may be 16-bit wide, 32-bit wide or 64-bit wide, depending on the number of input/output bits or the processing power of the MPU. The same thing is true of the bus 11 connected to the memory. FIG. 2 shows only the electric connection involving bus lines for 1 bit. The other bus lines omitted in FIG. 2 carrying the other bits are provided similarly and have the same respective impedance.

Due to a impedance mismatching occurring between the semiconductor device (the MPU chip or the memory chip) and the bus 11, an overshoot or a waveform distortion in the form of a glitch as shown in FIG. 3 occurs. Referring to FIG. 3, an overshoot refers to an excess in the level of data or control information transmitted over the bus 11 beyond a potential level $V_{cc}$ of a power supply of the semiconductor device. A certain time is required before the overshoot or the glitch is attenuated so that the data or the control information is identified on the bus 11. For this reason, as shown in FIG. 3, there is a demand to suppress an overshoot at time t1 and suppress generation of a reflected wave after time t2.

One conventional approach to attenuate the overshoot or the glitch in a short period of time is to provide a filter circuit between the MPU chip or the memory chip and the bus 11. Alternatively, a gate circuit having a predetermined number of stages for cutting off the overshoot or the glitch may be provided in the input/output circuit.

However, providing a filter circuit or a gate circuit to suppress the overshoot or the glitch prevents switching between signals from occurring on the bus 11 at a short period and prevents the semiconductor device from operating at a high-speed. Another problem with the conventional approach is that extra elements and circuits have to be introduced, thus increasing power consumption. Providing filters or gate circuits operating satisfactorily for each of a variety of semiconductor devices and the bus line 11 connected thereto requires a complicated design.

SUMMARY OF THE INVENTION

Accordingly, an object of the present invention is to provide interface circuits in which the aforementioned problems are eliminated.

Another and more specific object of the present invention is to provide an interface circuit capable of suppressing an overshoot and a glitch, a form of waveform distortion, occurring in data or control information transmitted on a bus are successfully suppressed, the overshoot being responsible for preventing a high-speed operation and the glitch causing an error.

The aforementioned objects can be accomplished by an interface circuit for semiconductor devices, wherein, when a switching in a potential level on a bus connected to semiconductor devices and transmitting data and control information is detected, the bus is controlled to be connected to one of predetermined potentials for a predetermined period of time, in correspondence with a direction in which the switching has occurred.

According to the interface circuit of the present invention, reflected waves occurring on the bus can be efficiently suppressed even when there is an impedance mismatching between the semiconductor device and the bus line. An overshoot and a glitch, a form of waveform distortion, occurring in data or control information transmitted on a bus can be successfully suppressed, the overshoot being responsible for preventing a high-speed operation and the glitch causing an error. Accordingly, the unfavorable effect of the overshoot or the glitch can be reduced. As a result, a period of signal switching on the bus can be shortened, thus enabling a high-speed operation of the semiconductor device, and preventing an erroneous operation of the semiconductor device.

BRIEF DESCRIPTION OF THE DRAWINGS

Other objects and further features of the present invention will be apparent from the following detailed description when read in conjunction with the accompanying drawings, in which:

FIG. 4 is a block diagram of an interface circuit according to a first embodiment of the present invention;

FIG. 5 is a block diagram showing connections between the semiconductor device provided with the interface circuit of FIG. 4 and the bus;

FIG. 6 how an overshoot or a glitch is suppressed in data or control information transmitted on the bus when the interface circuit of FIG. 4 is used;

FIGS. 7A and 7B are circuit diagrams showing two embodiments of a pulse generating unit provided in a controlling unit to generate a control signal in the interface circuit of FIG. 4;

FIGS. 9A, 9B and 9C are circuit diagrams showing embodiments of a potential stabilizing unit in the interface circuit of FIG. 4;

DESCRIPTION OF THE PREFERRED EMBODIMENTS

Figure 1:
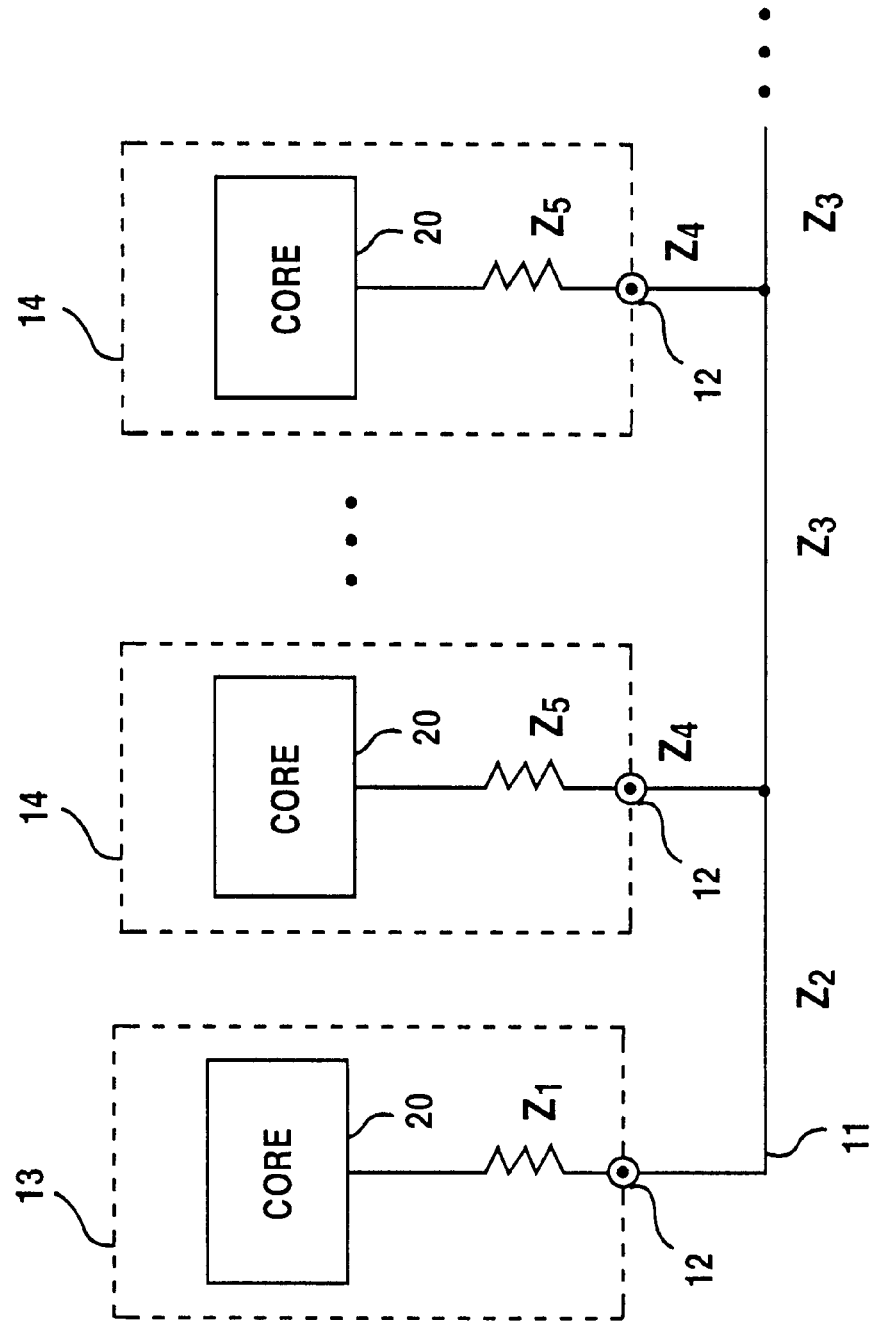
FIG. 1 is a block diagram of a conventional technology used to connect semiconductor devices with a bus via input terminal.
Figure 2:
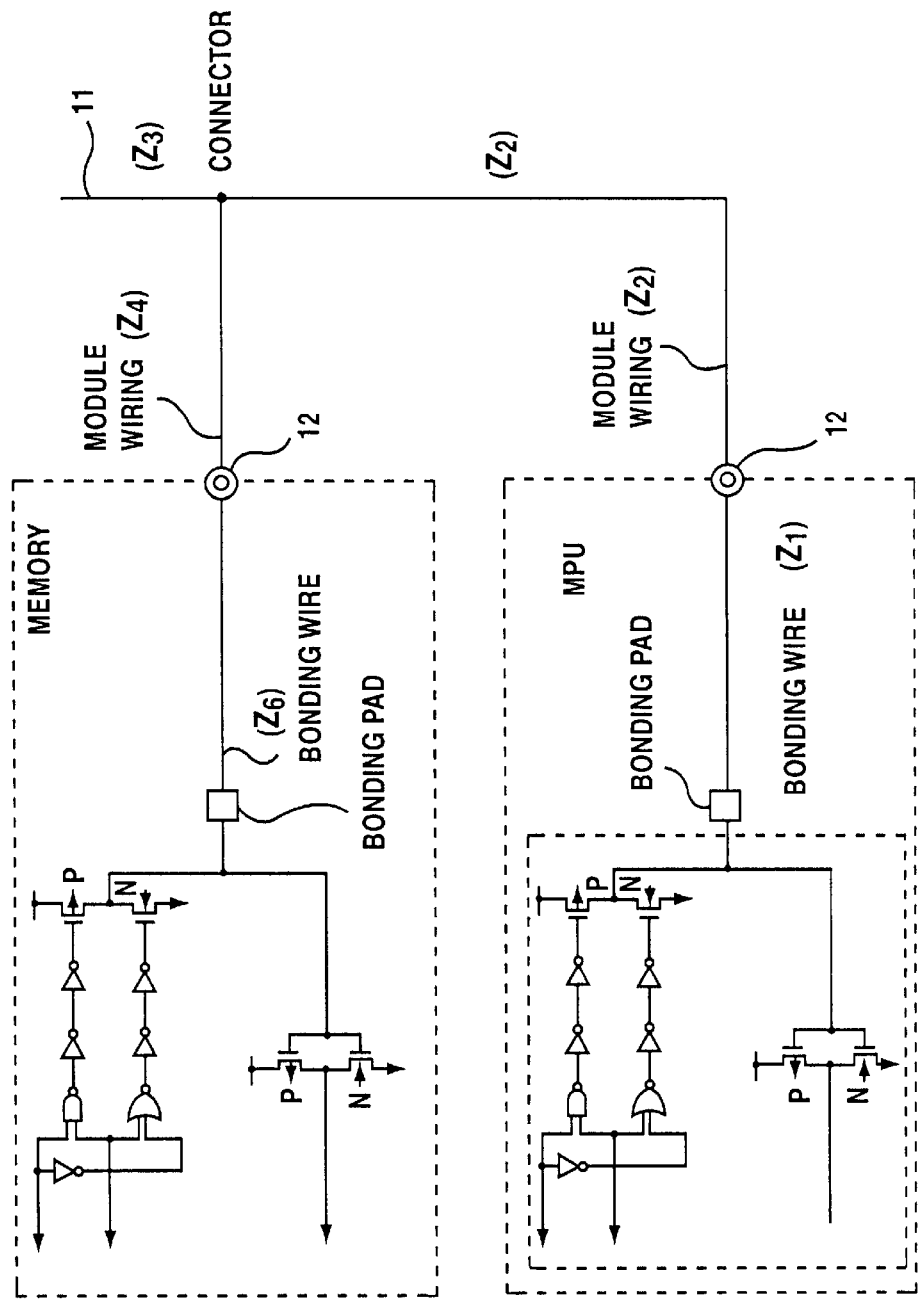
FIG. 2 shows how an impedance mismatching occurs between the semiconductor device and the bus.
Figure 3:
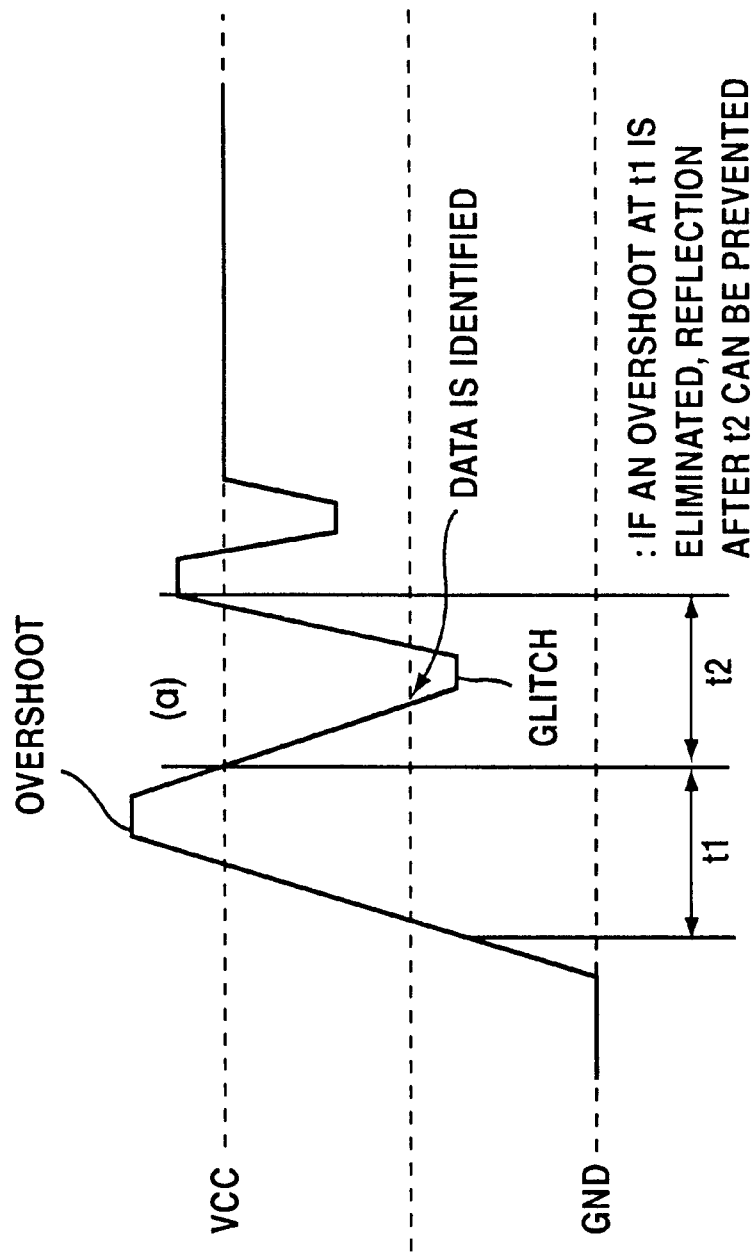
FIG. 3 shows an overshoot and a glitch occurring in data or control information transmitted over the bus.

FIG. 4 is a block diagram showing an interface circuit 10 according to a first embodiment of the present invention. FIG. 5 is a block diagram showing connections between the semiconductor devices (the MPU 13 and the memory 14) provided with the interface circuit 10 of FIG. 4 and the bus 11. FIG. 6 shows how an overshoot or a glitch is suppressed in data or control information transmitted on the bus when the interface circuit 10 is used.

In the first embodiment, the core circuit 20 executing a predetermined process (for example, numerical operation or storage of data) on data and the interface circuit 10 adapted for the number of bits (specifically, 16 bits, 32 bits or 64 bits) processed by the core circuit 20 are provided on the IC chip of the MPU 13 or the memory 14.

Providing the MPU 13 (or the memory 14) and the interface circuit 10 in the same package ensures that the MPU 13 (or the memory 14) and the interface circuit 10 are placed in the same operating environment and high reliability and compactness of the device are accomplished.

As indicated in FIG. 5, the core circuit 20 and the interface circuit 10 of the MPU 13 is connected to the input terminals 12 via a plurality of bonding pads formed on the IC chip for exchange of signals and via bonding wires each having an impedance of Z1. The core circuit 20 and the interface circuit 10 of the memory 14 is connected to the input terminals 12 via a plurality of bonding pads formed on the IC chip for exchange of signals and via bonding wires each having an impedance of Z5. Each of the IC chips is hermetically sealed in a package so as to constitute the MPU 13 chip or the memory 14 chip.

The MPU 13 chip is connected to the bus 11 having an impedance Z2 via a module wiring having an impedance Z2 formed on a printed circuit board or the like so as to form an electric circuit. The memory 14 chip is connected to the bus 11 having an impedance Z3 via a module wiring having an impedance Z4 formed on a printed circuit board or the like. The bus 11 may include a data bus line for transmitting data and a control bus line for transmitting control information such as address information or control instructions. The bus 11 formed on the printed circuit board may be 16-bit wide, 32-bit wide or 64-bit wide, depending on the number of input/output bits or the processing power of the MPU 13. The same thing is true of the bus 11 connected to the memory 14. FIG. 5 shows only the electric connection involving bus lines for 1 bit. The other bus lines omitted in FIG. 5 carrying the other bits are provided similarly and have the same respective impedance.

The interface circuit 10 according to the first embodiment is constructed such that, when a switching in the level of a potential of the bus 11 connected between the semiconductor devices (the MPU 13 and the memory 14) is detected, the bus 11 is electrically connected to a predetermined potential (specifically, the power supply potential $V_{cc}$ or the ground potential GND) for a predetermined period of time (hereinafter, referred to as a connection time) that depends on a direction of the switching.

As illustrated in FIG. 6, by connecting the core circuit 20 to the bus 11 via the interface circuit 10 according to the first embodiment, it is possible to prevent an overshoot beyond a power supply potential $V_{cc}$ occurring in an waveform of data or control information transmitted over the bus, even when there is an impedance mismatching between the semiconductor device (the MPU 13 or the memory 14) and the bus 11. More specifically, as shown in FIG. 6, an overshoot at time t1 is suppressed so that a reflected wave beyond time t2 is prevented from occurring. Thus, a glitch, a form of waveform distortion caused by an overshoot, is successfully suppressed. As a result, it takes less period of time for an overshoot or a glitch to be sufficiently attenuated for data or control information on the bus 11 to be properly identified. A filter circuit or a gate circuit having a predetermined number of stages that are conventionally used to attenuate an overshoot or a glitch in a short period of time are not necessary between the MPU 13 or the memory 14, and the bus 11.

It is to be appreciated that, according to the first embodiment, a period of signal switching on the bus 11 can be shortened, thus enabling a high-speed operation of the MPU 13 or the memory 14, and preventing an erroneous operation of the MPU 13 or the memory 14.

A more detailed description will be given of the interface circuit 10 according to the first embodiment.

As shown in FIG. 4, the interface circuit 10 according to the first embodiment comprises a switching unit 110, an input level detecting unit 120, a controlling unit 130 and a potential stabilizing unit 140.

The switching unit 110, connected to the controlling unit 130, the potential stabilizing unit 140 and the core circuit 20, establishes an electrical connection between a potential determined by a control signal 130a (described later) and the bus 11 for the connection time. The switching unit 10 is also connected to the input terminal 12 via a bonding wire having an impedance Z5.

The connection time in which the bus 11 is connected to the potential determined by the control signal 130a is shorter than an input period and an output period of the MPU 13 or the memory 14.

With this arrangement, it is possible to suppress a reflected wave on the bus 11 without disturbing the input period and the output period of the MPU 13 or the memory 14.

The input level detecting unit 120, connected to the control unit 130 and the core circuit 20, detects a switching in a potential level in the bus 11 and generates a detection signal 120a depending on the direction in which a switching takes place.

In accordance with the detection signal 120a, the controlling unit 130, connected to the switching unit 110 and the input level detecting unit 120, determines a level of the potential to which the bus 11 is to be connected and generates a control signal that causes the bus 11 to be connected to the selected level of potential for the connection time.

The potential stabilizing unit 140, connected to the switching unit 110, generates the potential of a predetermined level.

A description will now be given of each of the components that constitute the interface circuit 10 according to the first embodiment. Those components that are the same as the components already described are designated by the same reference numerals, and the description thereof is omitted.

FIGS. 7A and 7B are circuit diagrams showing two embodiments of a pulse generating unit 132 provided in the controlling unit 130 to generate the control signal 130a in the interface circuit of FIG. 4.

In accordance with the detection signal 120a, the pulse generating unit 132 generates the control signal 130a determining the connection time in which the bus 11 is set to the predetermined potential level selected. FIG. 7A shows a construction for outputting the control signal 130a by computing the NAND of the detection signal 120a and an output of a predetermined number of stages of NOT operators, the number of stages being determined by the connection time. FIG. 7B shows an alternative construction for outputting the control signal 130a by computing the NOR of the detection signal 120a and an output of a predetermined number of stages of NOT operators.

Figure 8:
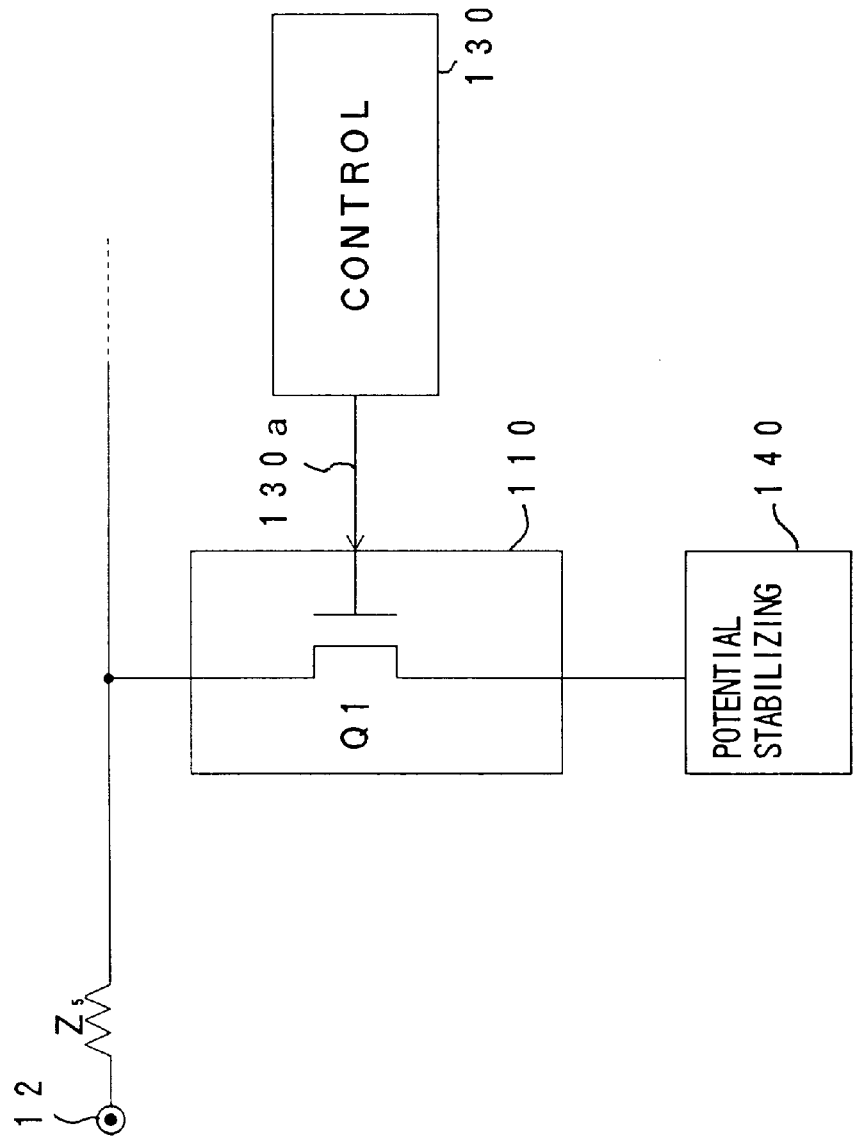
FIG. 8 is a circuit diagram showing an embodiment of a switching unit in the interface circuit of FIG. 4.

FIG. 8 is a circuit diagram showing an embodiment of the switching unit 110 in the interface circuit of FIG. 4.

As shown in FIG. 8, the switching unit 110 may be implemented by a switching transistor Q1. The drain of the switching transistor Q1 is connected to the bus 11 and the source thereof is connected to the potential stabilizing unit 140 so as to establish an electrical connection between the potential stabilizing unit 140 and the bus 11 for the connection time in accordance with the control signal 130a supplied to the gate.

FIGS. 9A, 9B and 9C are circuit diagrams showing embodiments of the potential stabilizing unit 140 in the interface circuit of FIG. 4. The potential stabilizing unit 140 as shown in FIG. 9A provides the power supply potential $V_{cc}$ or the ground potential GND of the MPU 13 or the memory 14. The potential stabilizing unit 140 as shown in FIG. 9B provides a potential generated by a terminal resistor Rt connected to the power supply potential $V_{cc}$. The potential stabilizing unit 140 as shown in FIG. 9C provides a potential generated by a capacitor Ct connected to the power supply potential $V_{cc}$.

The switching transistor Q1 connects the bus 11 to the predetermined potential provided by the potential stabilizing unit 140 for the connection time in accordance with the control signal 130a fed to the gate thereof.

Figure 10:
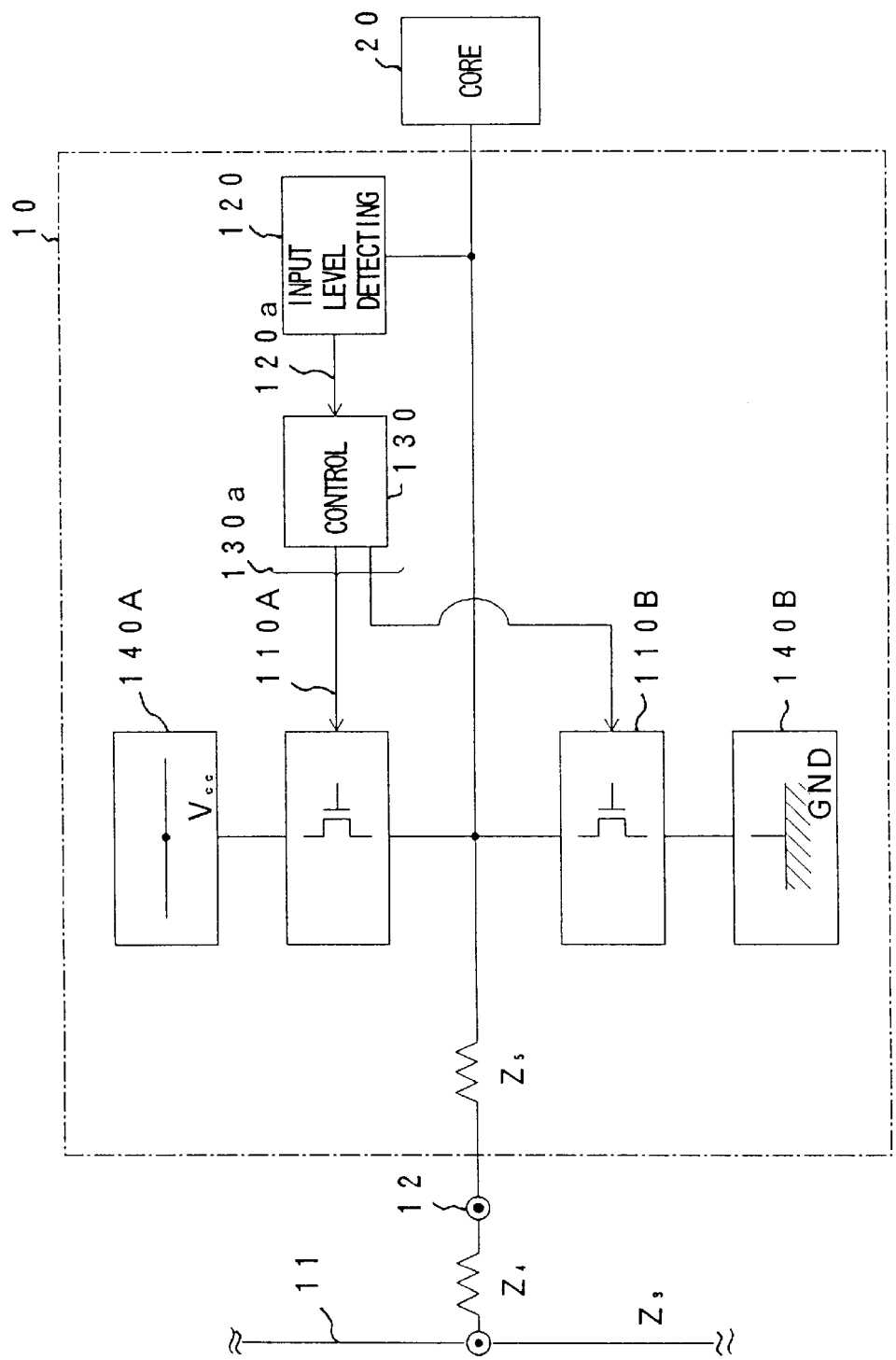
FIG. 10 is a block diagram showing an interface circuit according to a second embodiment of the present invention.

FIG. 10 is a block diagram showing the interface circuit 10 according to a second embodiment of the present invention effecting switching adapted for a logical level. Those components that are the same as the corresponding components already described are designated by the same reference numerals and the description thereof is omitted.

As shown in FIG. 10, the input level detecting unit 120, connected to the controlling unit 130 and the core circuit 20, detects a direction in which the potential of the bus 11 is switched by detecting a direction in which a logical level generated by the MPU 13 or the memory 14 is switched. The input level detecting unit 120 generates the detection signal 120a corresponding to the direction of switching.

A potential stabilizing unit 140A generates the power supply potential $V_{cc}$ of the MPU 13 or the memory 14 as the predetermined potential. A potential stabilizing unit 140B generates the ground potential GND of the MPU 13 or the memory 14 as the predetermined potential.

In response to the control signal 130a for causing the potential of the bus 11 to be stabilized at the power supply potential $V_{cc}$, a switching unit 110A, connected to the controlling unit 130, the potential stabilizing unit 140A and the core circuit 20, connects the bus 11 to the power supply potential $V_{cc}$ for the connection time. Likewise, in response to the control signal 130a for causing the potential of the bus 11 to be stabilized at the ground potential GND, a switching unit 110B, connected to the controlling unit 130, the potential stabilizing unit 140B and the core circuit 20, connects the bus 11 to the ground potential GND for the connection time. Each of the switching units 110A and 110B is connected to the input terminal 120 via a bonding wire having an impedance Z5.

In response to the detection signal 120a generated as a result of detecting the potential of the bus 11 being switched to a logical high, the controlling unit 130, connected to the switching units 110A, 110B and the input level detecting unit 120, generates the control signal 130a for causing the potential of the bus 11 to be stabilized at the power supply potential $V_{cc}$. Likewise, in response to the detection signal 120a generated as a result of detecting the potential of the bus 11 being switched to a logical low, the controlling unit 130 generates the control signal 130a for causing the potential of the bus 11 to be stabilized at the ground potential GND.

According to the interface circuit of FIG. 10, reflected waves occurring on the bus can be efficiently suppressed even when there is an impedance mismatching between the MPU 13 or the memory 14 and the bus line 11, depending on the logical level. An overshoot and a glitch, a form of waveform distortion, occurring in data or control information transmitted on a bus can be successfully suppressed, the overshoot being responsible for preventing a high-speed operation and the glitch causing an error. Accordingly, the unfavorable effect of the overshoot or the glitch can be reduced. As a result, a period of signal switching on the bus 11 can be shortened, thus enabling a high-speed operation of the MPU 13 or the memory 14, and preventing an erroneous operation of the MPU 13 or the memory 14.

Figure 11:
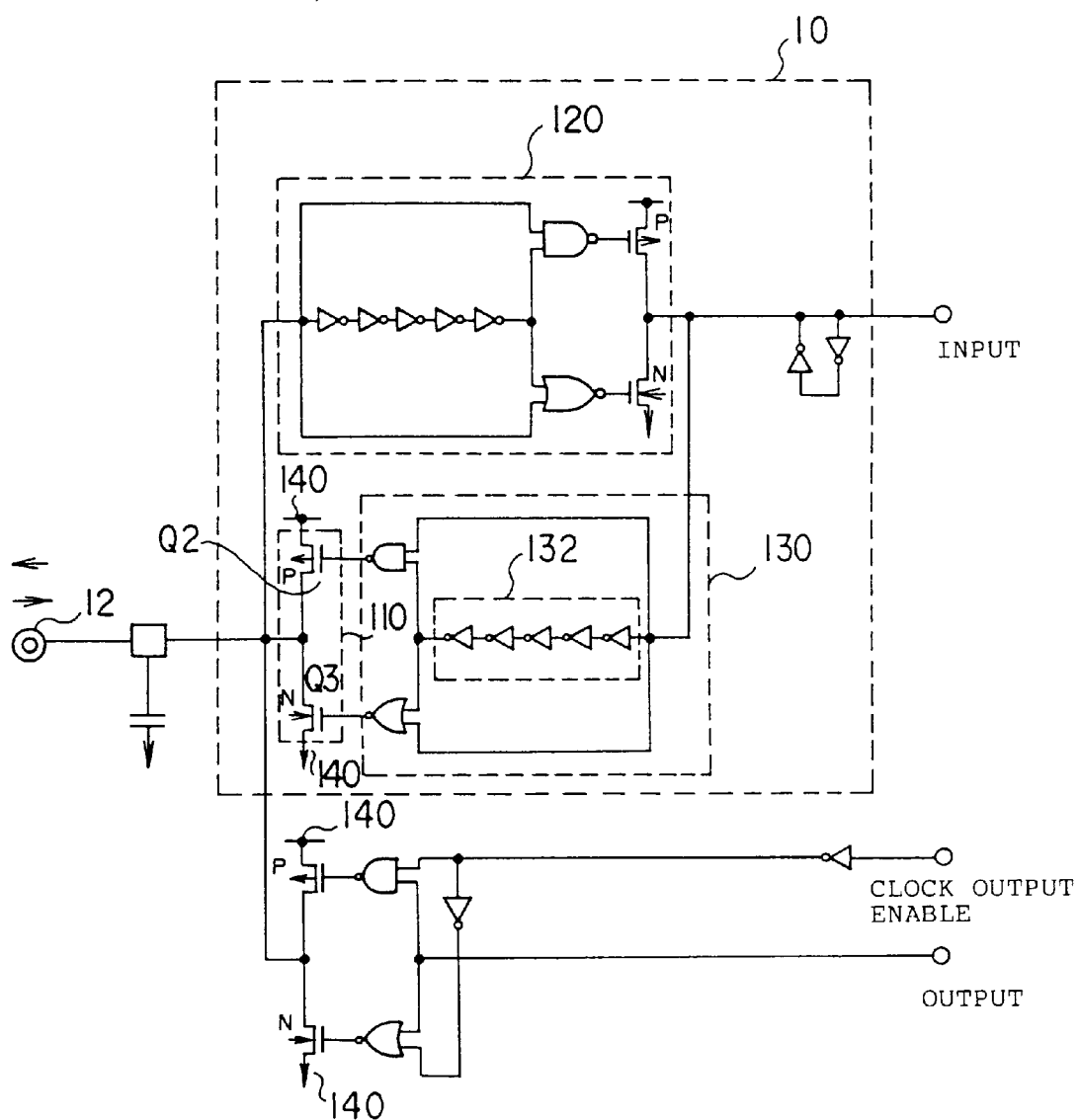
FIG. 11 is a circuit diagram showing a first specific embodiment of the interface circuit of FIG. 10.

FIG. 11 is a circuit diagram showing a first specific embodiment of the interface circuit 10 of FIG. 10.

The switching unit 110A is implemented by a switching transistor Q2 (more specifically, a pMOS transistor). In response to the control signal 130a for causing the potential of the bus 11 to be stabilized at the power supply potential $V_{cc}$ for the connection time, the switching transistor Q2, having its gate connected to the output of the controlling unit 130, its drain connected to the potential stabilizing unit 140, and its source connected to the core circuit 20, connects, by being turned ON, the bus 11 to the power supply potential $VP_{cc}$ for the connection time determined by the control signal 130a generated by the pulse generating unit 132.

Likewise, the switching unit 110B is implemented by a switching transistor Q3 (more specifically, a nMOS transistor). In response to the control signal for causing the potential of the bus 11 to be stabilized at the ground potential GND, the switching transistor Q3, having its gate connected to the output of the controlling unit 130, its source connected to the output of the potential stabilizing unit 140, and its drain connected to the core circuit 20, connects, by being turned ON, the bus 11 to the ground potential GND for the connection time.

The input level detecting unit 120 detects a switching in the potential level on the bus 11 by subjecting an input level to a predetermined number of stages of NOT elements (five stages in the case of FIG. 11), NANDing the input level and the output of the NOT elements, and NORing the input level and the output of the not elements. Based on these computations, the input level detecting unit 120 outputs the detection signal 120a.

In response to the control signal 120a, the pulse generating unit 132 composed of a predetermined number of stages of NOT elements generates the control signal 130a determining the connection time in which the potential of the bus 11 is stabilized at a predetermined level. The pulse generating unit 132 subjects the detection signal 120a to a predetermined number of stages of NOT elements, NANDs the output of the NOT elements and the detection signal 120a and outputs the NAND result to the switching transistor Q2 (switching unit 110A). Likewise, the pulse generating unit 132 NORs the output of the NOT elements and the detection signal 120a and outputs the NOR result to the switching transistor Q3 (switching unit 110B).

With the above described arrangement, the controlling unit 130 supplied with the detection signal 120a is able to determine the level at which the potential of the bus 11 is to be stabilized and generate the control signal 130a for causing the bus 11 to be connected to the determined potential for the connection time.

The potential stabilizing unit 140 provides the power supply potential $V_{cc}$ or the ground potential GND of the MPU 13 or the memory 14.

Figure 12:
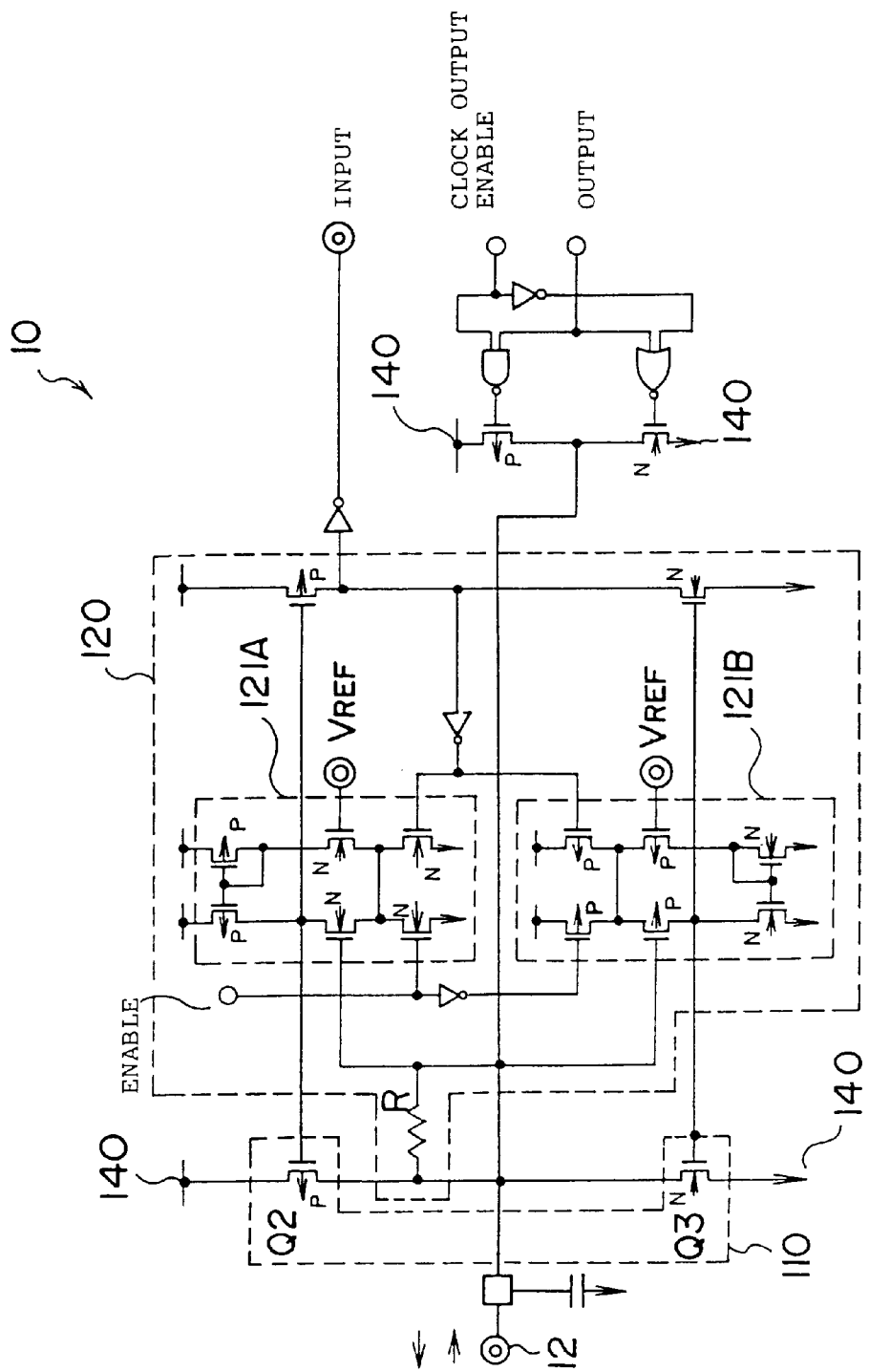
FIG. 12 is a circuit diagram showing a second specific embodiment of the interface circuit of FIG. 10.

FIG. 12 is a circuit diagram showing a second specific embodiment of the interface circuit 10 of FIG. 10. Those components that are the same as the components already described are designated by the same reference numerals, and the description thereof is omitted.

An occurrence of the potential of the bus 11 going logical high is detected via a resistor R connected to the input terminal 12 and the input level detecting unit 120. A current-mirror circuit 121A connected to the resistor R generates the detection signal 120a corresponding to the switching to the logical high. The detection signal 120a is fed to the gate of the switching transistor Q2 implemented by a pMOS transistor (switching unit 110A) as the control signal 130a for causing the potential of the bus 11 to be stabilized at the power supply potential $V_{cc}$. In response to the control signal 130a, the switching transistor Q2 electrically connects the bus 11 to the power supply potential $V_{cc}$.

An occurrence of the potential of the bus 11 going logical low is also detected via a resistor R connected to the input terminal 12 and the input level detecting unit 120. A current-mirror circuit 121B connected to the resistor R generates the detection signal 120a corresponding to the switching to the logical low. The detection signal 120a is fed to the gate of the switching transistor Q3 implemented by an nMOS transistor (switching unit 110B) as the control signal 130a for causing the potential of the bus 11 to be stabilized at the ground potential GND. In response to the control signal 130a, the switching transistor Q3 electrically connects the bus 11 to the ground potential GND.

Figure 13A:
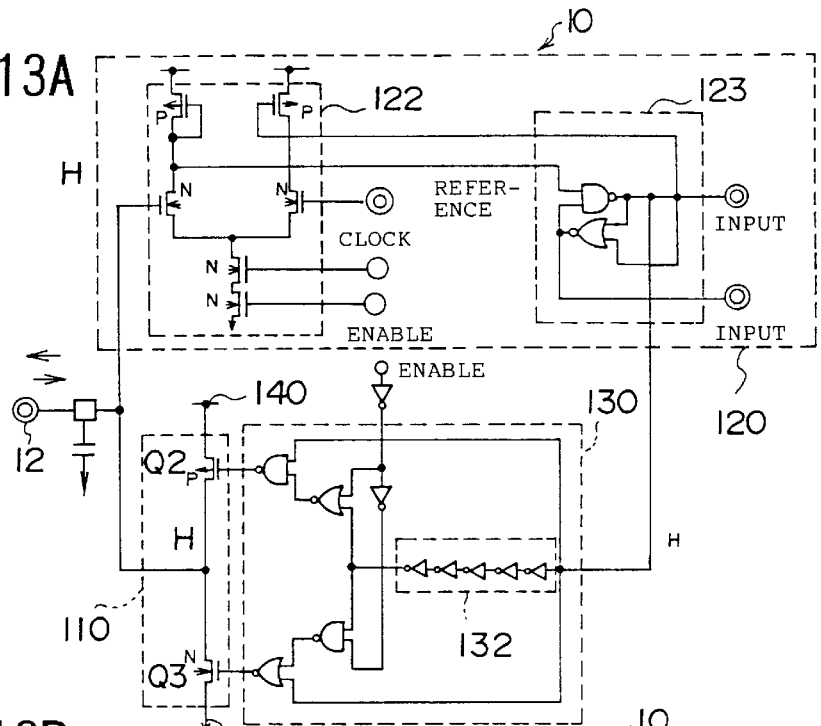
FIGS. 13A and 13B are circuit diagrams showing third and fourth specific embodiments of the interface circuit of FIG. 10.
Figure 13B:
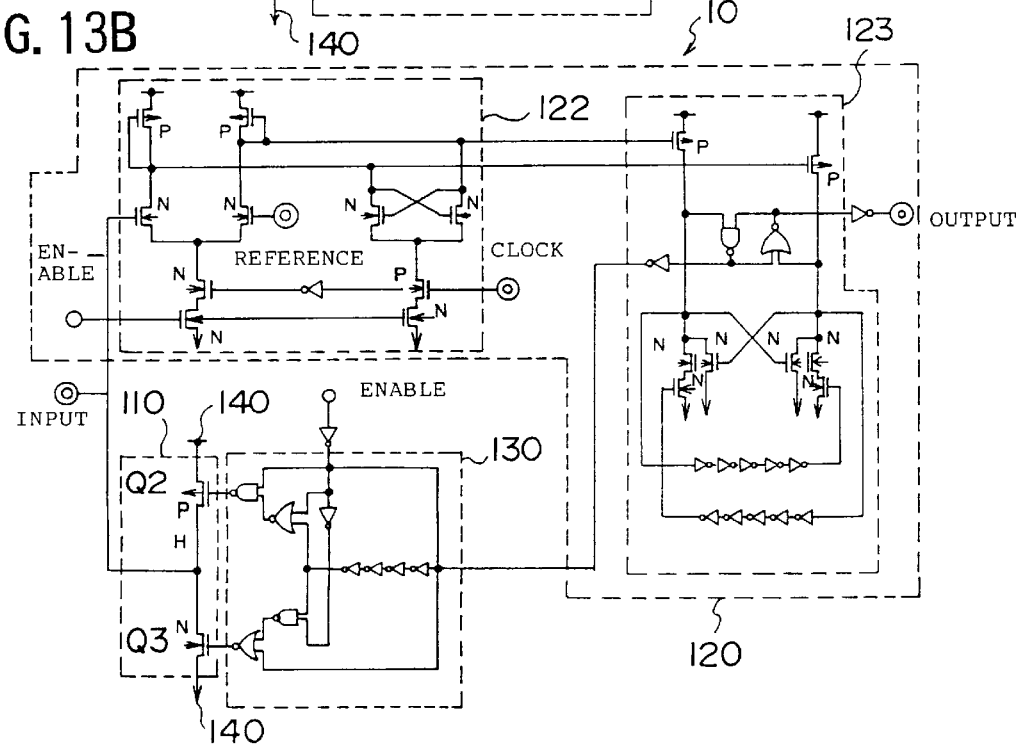

FIGS. 13A and 13B are circuit diagrams showing a third specific embodiment of the interface circuit 10 of FIG. 10. Those components that are already described are designated by the same reference numerals, and the description thereof will be omitted.

As shown in FIG. 13A, the potential switched to logical high or logical low is amplified by a differential amplifier circuit 122 provided in the input level detecting unit 120 so as to produce a difference output. The difference output is converted to a predetermined logical level by a level shift circuit 123 and output to the controlling unit 130.

An occurrence of the potential level of the bus 11 going high is detected by the input level detecting unit 120. The detection signal 120a generated by the input level detecting unit 120 corresponding to the switching direction (in this case, going high) is fed to the gate of the switching transistor Q2 implemented by a pMOS transistor (switching unit 110A) as the control signal 130a for causing the potential of the bus 11 to be stabilized at the power supply potential $V_{cc}$. In response to the control signal 130a, the switching transistor Q2 electrically connects the bus 11 to the power supply potential $V_{cc}$ for the connection time determined by the control signal 130a generated by the pulse generating unit 132.

An occurrence of the potential level of the bus 11 going low is detected by the input level detecting unit 120. The detection signal 120a generated by the input level detecting unit 120 corresponding to the switching direction (in this case, going low) is fed to the gate of the switching transistor Q3 implemented by an nMOS transistor (switching unit 110B) as the control signal 130a for causing the potential of the bus 11 to be stabilized at the ground potential GND. In response to the control signal 130a, the switching transistor Q3 electrically connects the bus 11 to the ground potential GND for the connection time determined by the control signal 130a generated by the pulse generating unit 132.

The circuit shown in FIG. 13B has a similar function as the circuit of FIG. 13A, and the description thereof is omitted.

Figure 14:
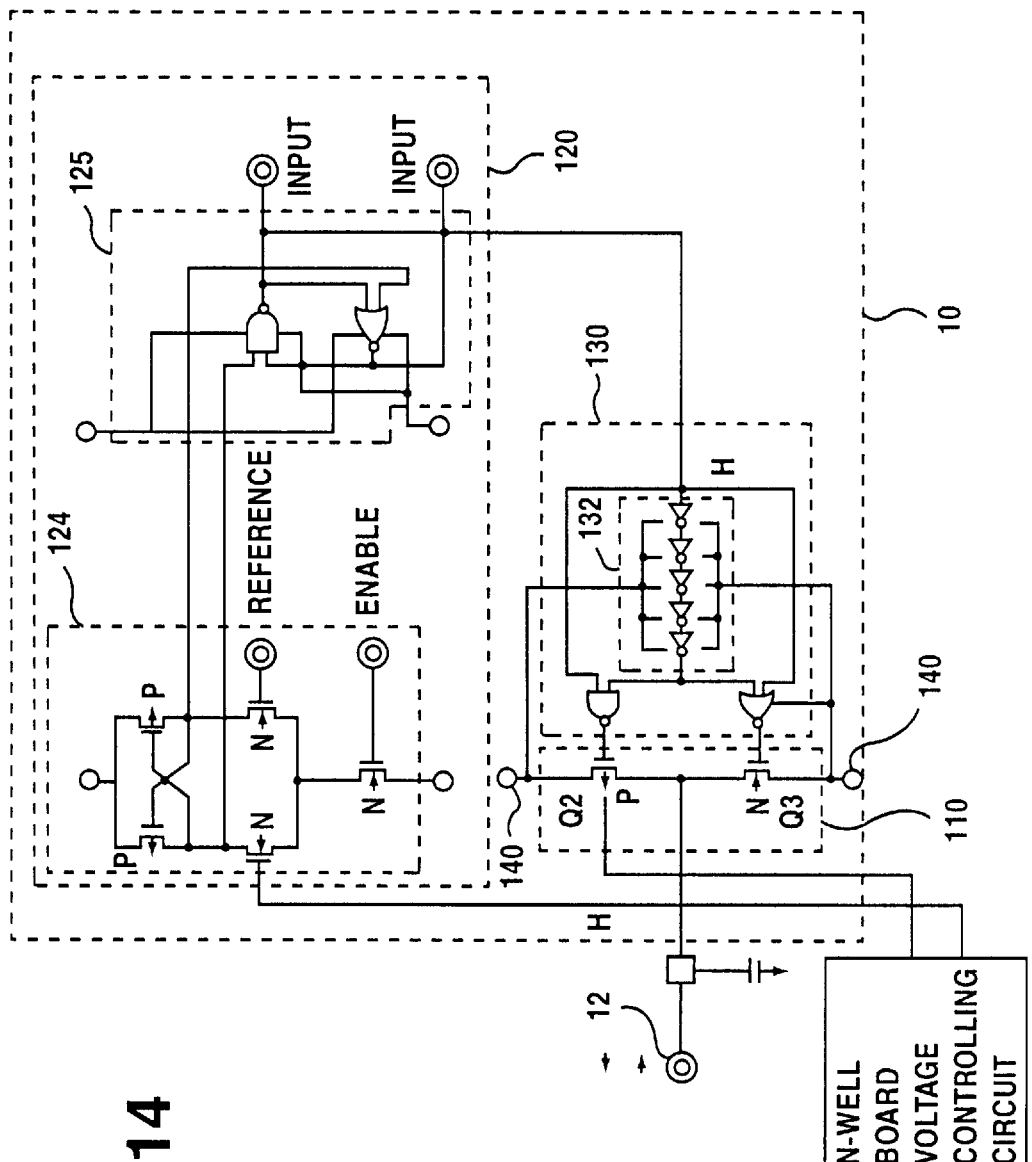
FIG. 14 is a circuit diagram showing a fifth embodiment of the interface circuit of FIG. 14.

FIG. 14 is a circuit diagram showing a fifth specific embodiment of the interface circuit of FIG. 10.

As shown FIG. 14, the potential switched to logical high or logical low is amplified by a difference amplifier circuit 124 provided in the input level detecting unit 120. An N-Well board voltage controlling circuit is connected to one of the inputs of the difference amplifier circuit 124 and a reference level REF is supplied to the other input of the difference amplifier circuit 124. The difference output is converted into a predetermined logical level by a level shift circuit 125 and output to the controlling unit 130.

An occurrence of the potential level of the bus 11 going high is detected by the input level detecting unit 120. The detection signal 120a generated by the input level detecting unit 120 corresponding to the switching direction (in this case, going high) is fed to the gate of the switching transistor Q2 implemented by a pMOS transistor (switching unit 110A) as the control signal 130a for causing the potential of the bus 11 to be stabilized at the power supply potential $V_{cc}$. In response to the control signal 130a, the switching transistor Q2 electrically connects the bus 11 to the power supply potential $V_{cc}$ for the connection time determined by the control signal 130a generated by the pulse generating unit 132.

An occurrence of the potential level of the bus 11 going low is detected by the input level detecting unit 120. The detection signal 120a generated by the input level detecting unit 120 corresponding to the switching direction (in this case, going low) is fed to the gate of the switching transistor Q3 implemented by an nMOS transistor (switching unit 110B) as the control signal 130a for causing the potential of the bus 11 to be stabilized at the ground potential GND. In response to the control signal 130a, the switching transistor Q3 electrically connects the bus 11 to the ground potential GND for the connection time determined by the control signal 130a generated by the pulse generating unit 132.

A description will now be given of the interface circuit 10 capable of suppressing reflected waves when data or control information is input and output.

Figure 15:
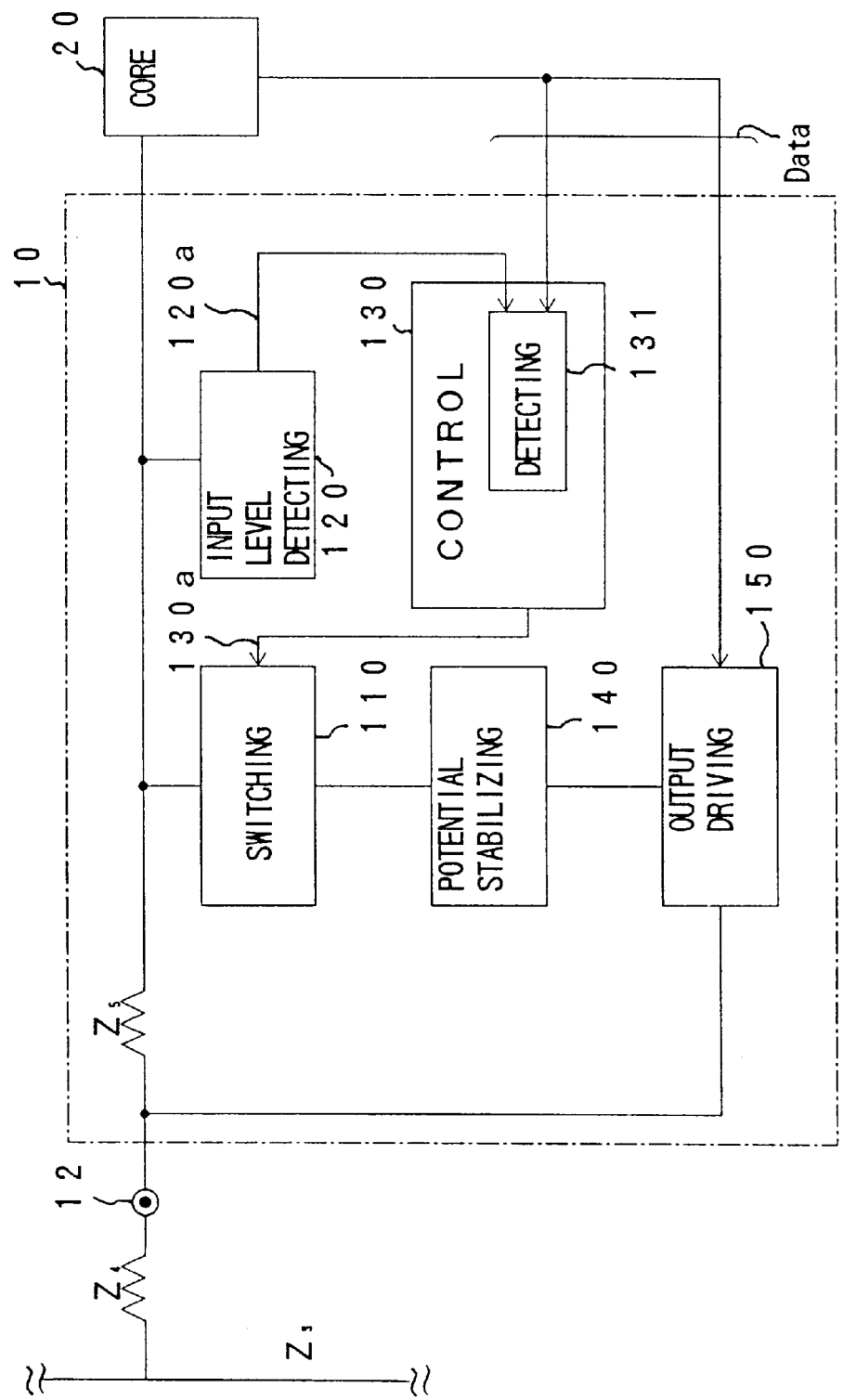
FIG. 15 is a functional block diagram showing the interface circuit according to a third embodiment capable of preventing reflected waves from occurring in the bus when data or control information is input and output.

FIG. 15 is a functional block diagram showing the interface circuit 10 according to a third embodiment capable of preventing reflected waves from occurring in the bus 11 when data or control information is input and output. Those components that are the same as the components already described are designated by the same reference numerals and the description thereof will be omitted.

As shown in FIG. 15, the interface circuit 10 according to the third embodiment has the switching unit 110, the input level detecting unit 120, the controlling unit 130, the potential stabilizing unit 140 and an output driving unit 150.

The switching unit 110, coupled to the controlling unit 130, the potential stabilizing unit 140 and the core circuit 20, electrically connects the bus 11 to the potential specified by the control signal 130a for a predetermined period of time. The switching circuit 110 is also connected to the input terminal 12 via a bonding wire having an impedance of Z5.

The input level detecting unit 120, connected to the controlling unit 130 and the core circuit 20, detects a switching in the potential level of the bus 11 and generates the detection signal corresponding to the direction in which the potential level is switched.

The controlling unit 130, connected to the core circuit 20, the switching unit 110 and the input level detecting unit 120, has a detecting unit 131 for detecting the detection signal 120a or an output of data or control information to the bus 11. Upon detection of the detection signal 120a or an output to the bus 11, the detecting unit 131 generates the control signal 130a.

With this arrangement, it is possible to suppress reflected waves on the bus 11, when the data or control information is input and output. Accordingly a period of signal switching on the bus 11 can be shortened, thus enabling a high-speed operation of the MPU 13 or the memory 14, and preventing an erroneous operation of the MPU 13 or the memory 14.

The potential stabilizing unit 140 for generating a predetermined potential is connected to the switching unit 110. The predetermined potential is the power supply potential $V_{cc}$ or the ground potential GND of the MPU 13 or the memory 14. As has been described, it is also possible for the potential stabilizing unit 140 to supply a potential generated by the capacitor to connected to the power supply potential $V_{cc}$ or a potential generated by the resistor Rt connected to the power supply potential $V_{cc}$.

The output driving unit 150, connected to the core circuit 20 and the potential stabilizing unit 140, drives the bus 11 for a predetermined period of time at a potential corresponding to the direction of the switching of the potential level on the bus 11 occurring when an output of the data or control information to the bus 11 is detected.

With this arrangement, it is possible to prevent reflected waves from occurring on the bus 11 when the data or control information is output. Accordingly a period of signal switching on the bus 11 can be shortened, thus enabling a high-speed operation of the MPU 13 or the memory 14, and preventing an erroneous operation of the MPU 13 or the memory 14.

Figure 16:
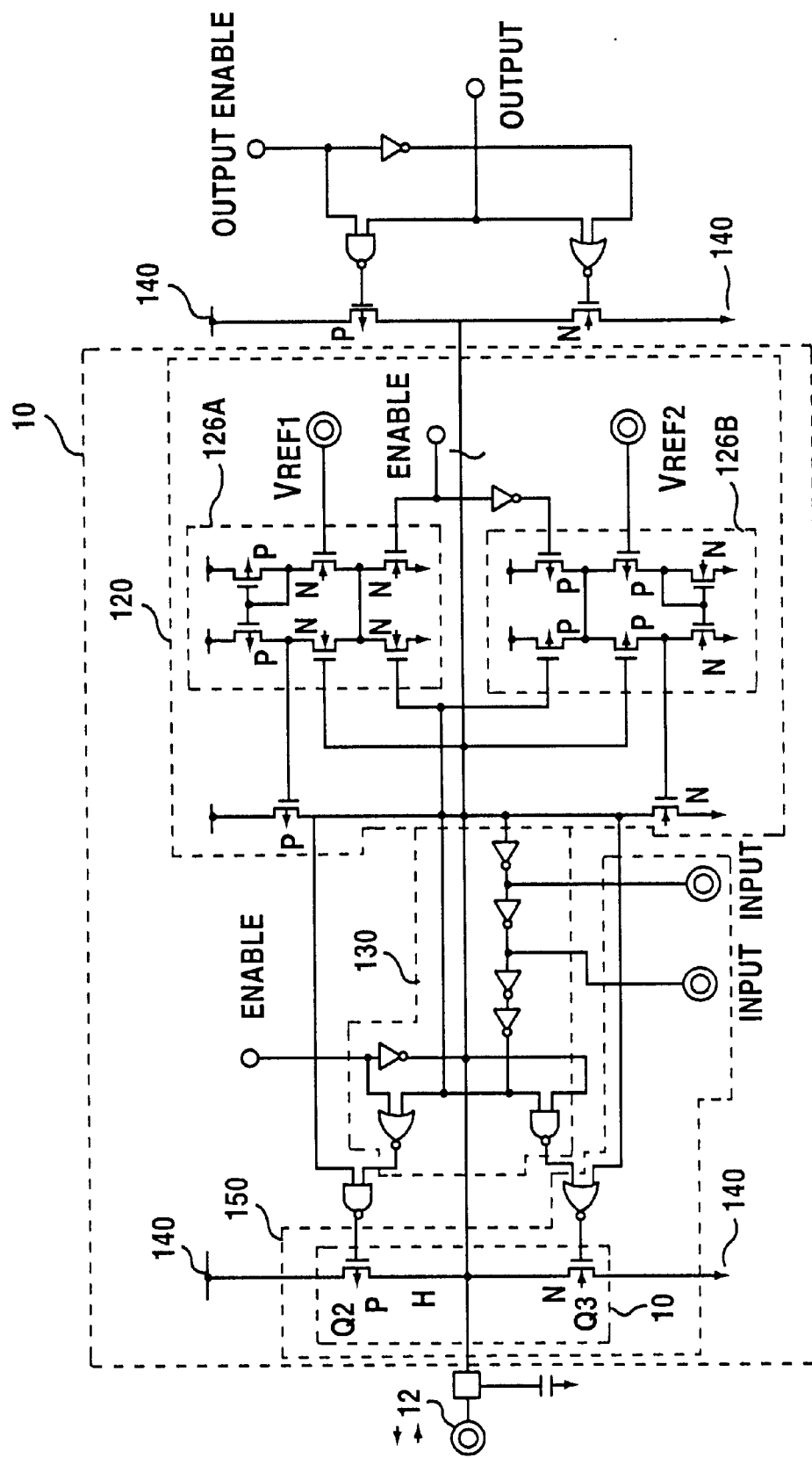
FIG. 16 is a circuit diagram showing a specific embodiment of the interface circuit of FIG. 15.

FIG. 16 is a circuit diagram showing a specific embodiment of the interface circuit 10 of FIG. 15. Those components that are the same as the components already described are designated by the same reference numerals, and the description thereof is omitted.

Referring to FIG. 16, an occurrence of the potential level of the bus 11 going high is detected by the input level detecting unit 120. A current-mirror circuit 126A provided in the input level detecting unit 120 generates the detection signal 120a corresponding to the switching direction (in this case, going high). Upon detecting the detection signal 120a or an output to the bus 11, the controlling unit 130 generates the control signal 130a for causing the potential of the bus 11 to be stabilized at the power supply potential $V_{cc}$, using the detecting unit 131. Subsequently, the control signal 130a is output to the gate of the switching transistor Q2 implemented by a pMOS transistor and functioning as the switching unit 110A and also as the output driving unit 150. The switching transistor Q2 then electrically connects the power supply potential $V_{cc}$ to the bus 11 in response to the control signal 130a for causing the potential of the bus 11 to be stabilized at the power supply potential $V_{cc}$.

An occurrence of the potential level of the bus 11 going low is detected by the input level detecting unit 120. A current-mirror circuit 126B provided in the input level detecting unit 120 generates the detection signal 120a corresponding to the switching direction (in this case, going low). Upon detecting the detection signal 120a or an output to the bus 11, the controlling unit 130 generates the control signal 130a for causing the potential of the bus 11 to be stabilized at the ground potential GND, using the detecting unit 131. Subsequently, the control signal 130a is output to the gate of the switching transistor Q3 implemented by an nMOS transistor and functioning as the switching unit 110B and also as the output driving unit 150. The switching transistor Q3 then electrically connects the ground potential GND to the bus 11 in response to the control signal 130a for causing the potential of the bus 11 to be stabilized at the ground potential GND.

The present invention is not limited to the above described embodiments, and variations and modifications may be made without departing from the scope of the present invention.

What is claimed is:

1. An interface circuit for a semiconductor device, comprising:

a level transition detecting circuit for detecting a transition in a logic level of a signal having information and transferred on a bus connected to the semiconductor device and generating a detection signal corresponding to a first or second direction of the transition;

reference potential nodes having predetermined potentials;

a control circuit for generating, in response to said detection signal, a control signal which specifies one of said predetermined potentials to which the bus should be connected and causes the bus to be electrically connected to the specified potential for a predetermined period of time; and a switch which, in response to said control signal, electrically connects the bus to the specified one of said predetermined potentials for the predetermined period of time.

2. The interface circuit as claimed in claim 1, said interface circuit further comprising a plurality of power supply lines for the semiconductor device, wherein said reference potential nodes are connected with the plurality of power supply lines directly, or via capacitors or via terminal resistors.

3. The interface circuit as claimed in claim 1, wherein one of said reference potential nodes has a power supply potential for the semiconductor devices and another of said reference potential nodes has a ground potential, wherein the control circuit generates said control signal for connecting the bus to said power supply potential in response to said detection signal indicating the first direction, and generates said control signal for connecting the bus to said ground potential in response to said detection signal indicating the second direction, and wherein said switch electrically connects the bus to said power supply potential or said ground potential for the predetermined period of time, in response to said control signal.

4. The interface circuit as claimed in claim 1, wherein said predetermined period of time is shorter than an input period and an output period of the semiconductor devices.

5. The interface circuit as claimed in claim 1, connected between a core circuit of the semiconductor device and the bus.

6. A semiconductor device comprising:

a terminal for receiving a signal having information and transferred on a bus connected to said semiconductor device;

a level transition detecting circuit for detecting a transition in a logic level of the signal and generating a first transition signal;

a first conductor line having a first reference potential; and a first switch for connecting the terminal with the first conductor line for a predetermined period in response to the first transition signal, to provide the terminal with the first reference potential.

7. The semiconductor device as claimed in claim 6, wherein said level transition detecting circuit detects a direction of the transition of the signal and generates said first transition signal or a second transition signal in response to said direction of the transition.

8. The semiconductor device as claimed in claim 7, further comprising:

a second conductor line having a second reference potential; and a second switch for connecting the terminal with the second conductor line for said predetermined period in response to said second transition signal.

9. The semiconductor device as claimed in claim 8, said level transition detecting circuit comprising:

a NAND gate receiving a first input signal from the signal and a second input signal which delays the first input signal through an inverted delay unit for generating said first transition signal; and a NOR gate receiving the first and the second input signal for generating said second transition signal.

10. The semiconductor device as claimed in claim 9, wherein a delay time at said inverted delay unit corresponds to said predetermined period.

11. The semiconductor device as claimed in claim 7, further comprising:

an output circuit for providing the terminal with an output signal;

wherein said level transition detecting circuit detects the transition in the logic level of the output signal.

12. The semiconductor device as claimed in claim 6, wherein said first switch is connected with said first conductor line directly, via a capacitor, or via a terminal resistor.

13. The semiconductor device as claimed in claim 6, wherein said predetermined period is shorter than an input period and an output period of the semiconductor device.

14. The semiconductor device as claimed in claim 6, further comprising an input circuit receiving said signal.

15. A semiconductor device comprising:

a terminal for receiving a signal having information;

a level transition detecting circuit for detecting a transition in a logic level of the signal and generating a first transition signal;

a first conductor line having a first reference potential;

a first switch for connecting the terminal with the first conductor line for a predetermined period in response to the first transition signal, to provide the terminal with the first reference potential; and an input circuit receiving said signal for discriminating the logic level of said signal at said terminal.

16. The semiconductor device as claimed in claim 15, wherein said level transition detecting circuit detects a direction of the transition of the signal and generates said first transition signal or a second transition signal in response to said direction of the transition.

17. The semiconductor device as claimed in claim 16, further comprising:

a second conductor line having a second reference potential; and a second switch for connecting the terminal with the second conductor line for said predetermined period in response to said second transition signal.

18. The semiconductor device as claimed in claim 17, said level transition detecting circuit comprising:

a NAND gate receiving a first input signal from the signal and a second input signal which delays the first input signal through an inverted delay unit for generating said first transition signal; and a NOR gate receiving the first and the second input signal for generating said second transition signal.

19. The semiconductor device as claimed in claim 18, wherein a delay time at said inverted delay unit corresponds to said predetermined period.

20. The semiconductor device as claimed in claim 15, wherein said first switch is connected with said first conductor line directly, via a capacitor, or via a terminal resistor.

* * * * *